United States Patent
Ko et al.

(10) Patent No.: US 11,292,475 B2
(45) Date of Patent: Apr. 5, 2022

(54) CONTROL SYSTEM AND METHOD FOR REDUCING DRIVE SHAFT VIBRATION OF AN ENVIRONMENT-FRIENDLY VEHICLE

(71) Applicants: HYUNDAI MOTOR COMPANY, Seoul (KR); KIA MOTORS CORPORATION, Seoul (KR)

(72) Inventors: Young Kwan Ko, Seoul (KR); Jun Mo An, Suwon-si (KR); Byung Hoon Yang, Seongnam-si (KR); Hyung Souk Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/994,179

(22) Filed: Aug. 14, 2020

(65) Prior Publication Data
US 2021/0163012 A1    Jun. 3, 2021

(30) Foreign Application Priority Data
Nov. 28, 2019   (KR) ........................ 10-2019-0155095

(51) Int. Cl.
*B60W 30/20*   (2006.01)

(52) U.S. Cl.
CPC ....... *B60W 30/20* (2013.01); *B60W 2030/206* (2013.01); *B60W 2510/0638* (2013.01); *B60W 2510/081* (2013.01); *B60W 2510/083* (2013.01); *B60W 2710/081* (2013.01); *B60W 2710/083* (2013.01)

(58) Field of Classification Search
CPC .......... B60W 30/20; B60W 2030/206; B60W 2510/0638; B60W 2510/081; B60W 2510/083; B60W 2710/081; B60W 2710/083
USPC .......................................................... 477/3
See application file for complete search history.

(56) References Cited

U.S. PATENT DOCUMENTS

| 9,527,503 B2 | 12/2016 | Chung |   |
|---|---|---|---|
| 9,925,891 B2 | 3/2018 | Ko |   |
| 2015/0032309 A1* | 1/2015 | Liang | B60W 20/40 701/22 |
| 2016/0159340 A1 | 6/2016 | Chung |   |
| 2017/0043677 A1 | 2/2017 | Ko |   |

(Continued)

FOREIGN PATENT DOCUMENTS

| KR | 101619663 B1 | 5/2016 |
|---|---|---|
| KR | 101704243 B1 | 2/2017 |

*Primary Examiner* — Roger L Pang
(74) *Attorney, Agent, or Firm* — Lempia Summerfield Katz LLC

(57) ABSTRACT

A control system for reducing drive shaft vibration of an environment-friendly vehicle includes: a drive shaft speed extraction unit that extracts an actual drive shaft speed of a motor and extracts a drive shaft speed from which a forced vibration component that is to be transferred by an engine to the drive shaft is removed; a model speed computation unit that calculates a model speed of the drive shaft; a free vibration computation unit that computes a free vibration component on the basis of deviation between the drive shaft speed and the calculated model speed; and a first torque computation unit that calculates, from the free vibration component, a free vibration reduction compensation torque for reducing the drive shaft vibration.

10 Claims, 6 Drawing Sheets

(56) References Cited

U.S. PATENT DOCUMENTS

2017/0313299 A1* 11/2017 Yun .......................... B60K 6/22
2018/0290659 A1* 10/2018 Tsukada ................ B60W 10/08

* cited by examiner

CONTROL SYSTEM AND METHOD FOR REDUCING DRIVE SHAFT VIBRATION OF AN ENVIRONMENT-FRIENDLY VEHICLE

CROSS REFERENCE TO RELATED APPLICATION

The present application claims priority to Korean Patent Application No. 10-2019-0155095, filed Nov. 28, 2019, the entire contents of which are incorporated herein for all purposes by this reference.

BACKGROUND

Field of the Disclosure

The present disclosure relates to a control system for and a control method of reducing drive shaft vibration of an environment-friendly vehicle. More particularly, the present disclosure relates to a control system for and a control method of reducing drive shaft vibration of an environment-friendly vehicle, which simultaneously reduces free vibration that occurs in a drive shaft and forced vibration that occurs by an engine, using a motor mechanically coupled to the drive shaft.

Description of the Related Art

Environment-friendly vehicles, such as electric vehicles (EV) and hybrid electric vehicles (HEV), travel using an electric motor as a driving source. Electric vehicles travel only with motive power of the electric motor that operates on battery power. Hybrid vehicles travel with an efficient combination of motive power of an engine and motive power of the electric motor.

On the other hand, a disadvantage with the above environment-friendly vehicles is that a mechanical damping effect that can be brought about by an existing torque converter cannot be obtained. Therefore, when a driver moves a gearshift level to any gear position, performs tip-in/out (an operation of pushing on or releasing an accelerator pedal), engages an engine clutch, and so on, vibration occurs in a drive shaft. A vibration phenomenon, such as a shock and jerk (an instantaneous sudden movement), also occurs. In other words, because a damping means present between each of the torque sources (an engine and a motor) and a drive system is excluded or is small, there is a problem in that vibration from the torque source or vibration from the outside is not well attenuated. In order to reduce the vibration that occurs in the drive shaft in this manner, it is necessary to extract a vibration component of the drive shaft. It is also important to extract an exact vibration component because vibration reduction performance differs with the precision of the extraction of the vibration component.

Factors that exert an influence on the drive shaft are largely divided into free vibration that is due to rotation of the drive shaft and forced vibration that is transferred by an engine to a motor. Controls that reduce the free vibration and the forced vibration, respectively, exist, but a problem occurs in that the controls that reduce the free vibration and the forced vibration, respectively, cause interference with each other. Particularly, a torque derived in order to reduce the free vibration exerts an influence on a torque derived in order to reduce the forced vibration. Thus, a problem occurs in that overall control performance for reducing the vibration is decreased.

SUMMARY

An objective of the present disclosure is to provide a control system and a control method that are capable of preventing interference that occurs between a free vibration compensation torque for reducing free vibration and a forced vibration compensation torque for reducing forced vibration.

According to an aspect of the present disclosure, a control system is provided for reducing drive shaft vibration of an environment-friendly vehicle. The control system for reducing drive shaft vibration of an environment-friendly vehicle includes: a drive shaft speed extraction unit that extracts an actual drive shaft speed of a motor and extracts a drive shaft speed from which a forced vibration component that is to be transferred by an engine to the drive shaft is removed; a model speed computation unit that calculates a model speed of the drive shaft; a free vibration computation unit that computes a free vibration component on the basis of deviation between the drive shaft speed and the calculated model speed; and a first torque computation unit that calculates, from the free vibration component, a free vibration reduction compensation torque for reducing the drive shaft vibration.

According to the aspect of the present disclosure, in the control system, the drive shaft speed extraction unit may extract the drive shaft speed from which the forced vibration component is removed, on the basis of a forced vibration frequency that is derived on the basis of an engine shaft speed.

According to the aspect of the present disclosure, in the control system, the forced vibration frequency may be a vibration frequency of the engine, which is calculated on the basis of the number of cylinders in the engine and the number of revolutions in the engine.

According to the aspect of the present disclosure, in the control system, the drive shaft speed extraction unit may include: a filtering unit that extracts the forced vibration component from the actual drive shaft speed on the basis of the forced vibration frequency; a vibration magnitude compensation unit that compensates for a vibration magnitude of the forced vibration component; and an enforced vibration removal unit that calculates the drive shaft speed that is a value, which results from subtracting the forced vibration component of which the vibration magnitude is compensated for, from the actual drive shaft speed.

According to the aspect of the present disclosure, in the control system, the filtering unit may be configured with a combination of a low pass filter and a high pass filter in which the forced vibration frequency is set to be a cut-off frequency.

According to the aspect of the present disclosure, in the control system, the low pass filter and the high pass filter may be designed in such a manner as not to change a phase of the actual drive shaft speed.

According to the aspect of the present disclosure, in the control system, the model speed computation unit may include: a drive shaft output request torque calculation unit that computes a drive shaft output request torque on the basis of a torque that is transferred to the drive shaft; a drive shaft input torque estimation unit that estimates, using the actual drive shaft speed, a drive shaft input torque that is to be input to the drive shaft; a disturbance torque calculation unit that estimates a disturbance torque using the drive shaft output request torque and the drive shaft input torque; and a speed calculation unit that computes, using the estimated disturbance torque, a drive shaft model input torque which results from adding the disturbance torque to the drive shaft output request torque, and that computes a model speed using a drive shaft model in which the drive shaft model input torque is set to be an input.

According to the aspect of the present disclosure, in the control system, the model speed may mean an ideal drive shaft speed in which the free vibration component is not included, and a value that results from subtracting the model speed from the drive shaft speed may mean the free vibration component from which the forced vibration component is removed.

According to another aspect of the present disclosure, a control method is provided for reducing drive shaft vibration of a friendly-environment vehicle. The control method of reducing drive shaft vibration of a friendly-environment vehicle includes: extracting an actual drive shaft speed of a motor; removing a forced vibration component that is to be transferred by an engine to the drive shaft, from the actual drive shaft speed; calculating a model speed of the drive shaft; computing a free vibration component on the basis of deviation between a drive shaft speed from which the forced vibration component is removed and the calculated model speed; and calculating, from the free vibration component, a free vibration reduction compensation torque for reducing vibration of the drive shaft.

According to the aspect of the present disclosure, in the control method, in the removing of the forced vibration component from the actual drive shaft speed, the actual drive shaft speed may be filtered on the basis of a forced vibration frequency that is derived on the basis of an engine shaft speed. Thus, the drive shaft speed from which the forced vibration component is removed may be extracted.

According to the aspect of the present disclosure, in the control method, the removing of the forced vibration component from the actual drive shaft speed may include: setting the forced vibration frequency to be a cut-off frequency and extracting the forced vibration component from the actual drive shaft speed; compensating for a vibration magnitude of the forced vibration component; and calculating, from the actual drive shaft speed, the drive shaft speed that is a value, which results from subtracting the forced vibration component of which the vibration magnitude is compensated for.

According to the aspect of the present disclosure, in the control system, the model speed may be an ideal drive shaft speed in which the free vibration component is not included. A value that results from subtracting the model speed from the drive shaft speed may be the free vibration component from which the forced vibration component is removed.

A control system for reducing drive shaft vibration of an environment-friendly vehicle according to an embodiment of the present disclosure prevents interference that occurs between a free vibration compensation torque for reducing free vibration and a forced vibration compensation torque for reducing forced vibration and thus prevents a decrease in control performance for compensating for the vibration.

DETAILED DESCRIPTION

Figure 1:
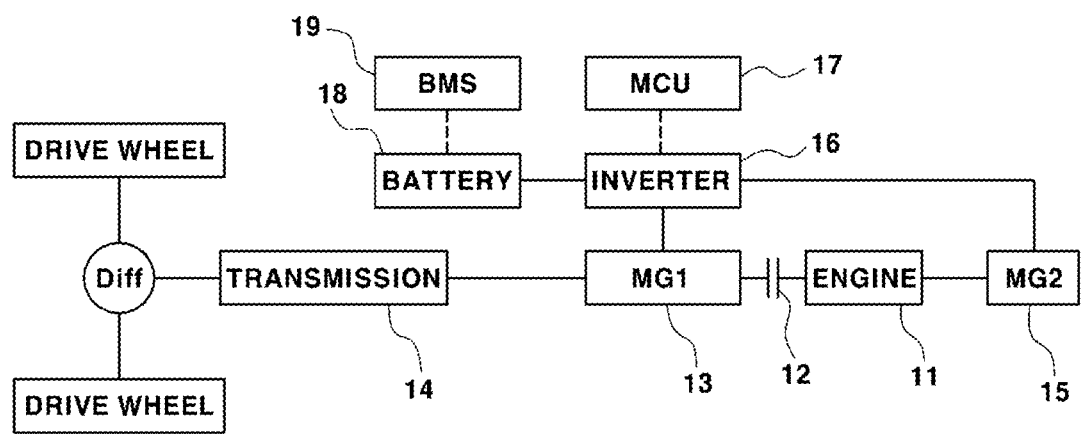
FIG. 1 is a diagram for describing a system configuration of a hybrid vehicle according to an embodiment of the present disclosure.

Advantages and features of the present disclosure, and methods of achieving the advantages and the features, will be apparent from the accompanying drawings and from embodiments that are described in detail below. However, the present disclosure is not limited to the embodiments that are disclosed below. Various different embodiments thereof can be realized. The embodiments are provided to make a complete disclosure of the present inventive concepts and to put a person of ordinary skill in the art to which the present disclosure pertains on full notice as to the scope of the disclosure. However, the scope of the present disclosure should be only defined by the claims. The same reference characters throughout the specification refer to the same constituent elements.

The terms "unit", "module", or the like, which may be used throughout the specification, mean an individual component that performs at least one function or operation and may be realized in hardware, in software, or both in hardware and in software. When a component, device, controller, unit, element, or the like of the present disclosure is described as having a purpose or performing an operation, function, or the like, the component, device, or element should be considered herein as being "configured to" meet that purpose or to perform that operation or function. Further, each controller, unit, module, or the like described herein may include a processor programmed to meet that purpose or perform the noted operation or function.

In addition, in order to distinguish among constituent elements that have the same name, the terms first, second, and so on are used throughout the present specification. In the following description, no limitation to this order is necessarily imposed.

The present disclosure is described in detail in an illustrative manner. In addition, the above description is provided for embodiments of the present disclosure. The present disclosure may be implemented in various different combinations with various different alterations under various different environments. Modifications or alterations to the disclosure are possible within the scope of the inventive concept disclosed in the present specification, the scope of equivalents of described contents of the disclosure, and/or the scope of technologies or of knowledge in the art. Optimal requirements for realizing the technical idea of the present disclosure are described for the embodiments. Various modifications that are required in the field in which the present disclosure finds application and that are required to use the present disclosure are also possible. Therefore, the above detailed description relating to the disclosure is not intended to impose any limitation to the disclosed embodiments. In addition, the claims should be construed to cover other embodiments as well.

FIG. 1 is a diagram for describing a system configuration of a hybrid vehicle according to an embodiment of the present disclosure.

FIG. 1 illustrates a configuration of a power train that is of a transmission mounted electric device (TMED) type. A transmission 14 is disposed to the output side of a drive motor 13 of the powertrain.

A driving source for moving the vehicle includes: an engine 11 and a driving motor 13 that are arranged in series; an engine clutch 12 that is disposed to allow or disallow motive power transfer between the engine 11 and the driving motor 13; a transmission 14 that is shifted among various gears to transfer the motive power of the engine 11 and the motive power of the driving motor 13 to a drive shaft; and a starter-generator 15 that is connected directly to the engine 11, possibly for motive power transfer.

The engine clutch 12 allows or disallows the power transfer between two driving sources, i.e., the engine 11 and the drive motor 13, which drive a vehicle through a lock-up or opening operation.

A battery 18 that is a motive power source (electric power source) of a vehicle is connected to the drive motor 13 and the starter-generator 15 through an inverter 16, possibly for charging/discharging. The inverter 16 converts direct current of the battery 18 into three-phase alternating current for driving the drive motor 13 and the starter-generator 15 and applies the resulting alternating current to the drive motor 13 and the starter-generator 15.

The starter-generator 15 is a device that performs a function that results from integrating the respective functions of a starter motor and a generator. The starter-generator 15 also transmits its own motive power to the engine 11 through a motive power transfer mechanism (for example, a belt or a pulley) when starting a vehicle, or generates power with a rotational force transferred from the engine 11. In addition, the starter-generator 15 charges the battery 18 with electric energy that is generated during power generation.

Figure 2:
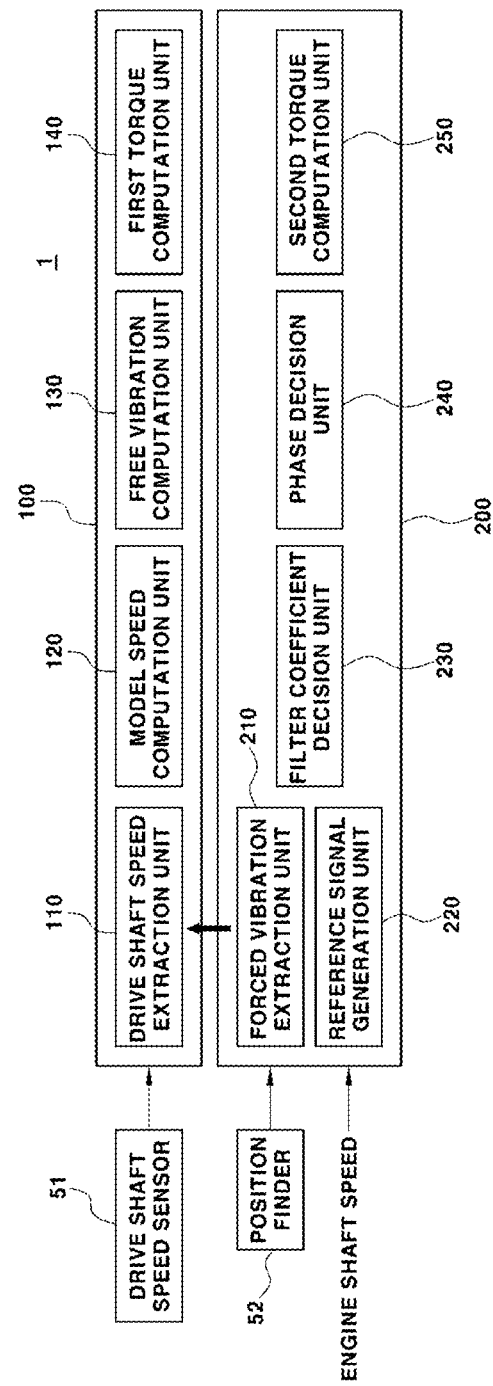
FIG. 2 is a block diagram illustrating a control system for reducing drive shaft vibration of an environment-friendly vehicle according to an embodiment of the present disclosure.

FIG. 2 is a block diagram illustrating a control system for reducing drive shaft vibration of an environment-friendly vehicle according to an embodiment of the present disclosure.

With reference to FIGS. 1 and 2, a control system 1 for reducing drive shaft vibration of an environment-friendly vehicle includes a free vibration compensation torque calculation unit 100 that calculates a free vibration compensation torque for reducing free vibration. The control system 1 also includes a forced vibration compensation torque calculation unit 200 that calculates forced vibration compensation torque for reducing forced vibration. The control system 1 for reducing drive shaft vibration of an environment-friendly vehicle according to the embodiment of the present disclosure is for reducing both the free vibration occurring a drive shaft of the motor 13 and the forced vibration that is to be transferred by the engine to the drive shaft of the motor 13. The contro system 1 also prevents interference that occurs between the free vibration compensation torque for reducing the free vibration reduction and the forced vibration compensation torque for reducing the forced vibration. To this end, in the control system 1 for reducing drive shaft vibration of an environment-friendly vehicle, a forced vibration frequency is taken into consideration in calculating the free vibration compensation torque.

The free vibration compensation torque calculation unit 100 calculates the free vibration compensation torque for reducing the free vibration occurring in the drive shaft of the drive motor 13. The drive shaft is a shaft to which a torque of the drive motor 13 is output. The drive shaft in this sense can be a drive motor output shaft and an input to the transmission. In this case, a drive shaft speed is the same as a drive motor speed, and therefore, the free vibration compensation torque calculation unit 100 extracts a free vibration component on the basis of the drive shaft speed instead of the drive motor speed. A drive shaft speed sensor 51 measures an actual drive shaft speed that rotates with driving by the drive motor. The actual drive shaft speed is used as a variable in a process of computing a model speed and in a process of extracting the free vibration component. The free vibration compensation torque calculation unit 100 includes a drive shaft speed extraction unit 110, a model speed computation unit 120, a free vibration computation unit 130, and a first torque computation unit 140.

The drive shaft speed extraction unit 110 extracts a forced vibration component from the actual drive shaft speed. Vibration that is to be transferred by the engine to the drive shaft of the drive motor is defined as the forced vibration. Vibration that occurs by rotation of the drive shaft of the drive motor is defined as the free vibration. However, because a compensation torque that is derived for control to reduce the free vibration includes a torque for reducing up to the forced vibration occurring in the engine, this compensation torque causes interference with a compensation torque calculated through separate control for reducing the forced vibration. In other words, the free vibration compensation torque and the forced vibration compensation torque that are derived from control processes, respectively, cause interference with each other. Therefore, the drive shaft speed extraction unit 110 according to the embodiment of the present disclosure uses the forced vibration frequency derived from a forced vibration signal in order to remove the forced vibration component from the free vibration compensation torque. The drive shaft speed extraction unit 110 receives the forced vibration frequency of the forced vibration signal extracted from a forced vibration extraction unit 210, which is described below. Specifically, the forced vibration frequency is a cut-off frequency that is used in the forced vibration extraction unit 210 for extracting only the forced vibration component. In this case, the forced vibration frequency is a vibration frequency of the engine, which is calculated on the basis of the number of cylinders of the engine and the number of engine revolutions. For example, in a four-cylinder, four-stroke internal combustion engine, a power stroke occurs two times with each mechanical revolution. Therefore, a power-stroke component in a frequency that is two times an engine revolution speed is observed. Considering this, the cut-off frequency is decided. A signal that results from removing the forced vibration component from an actual speed signal of the drive shaft is a signal for a drive shaft speed. In other words, a signal that results from subtracting the forced vibration component from the actual drive shaft speed is defined as the drive shaft speed.

The model speed computation unit 120 computes, using vehicle signals, a model speed that is a virtual drive shaft speed in which a vibration component is not included. The vehicle signals include at least one of a vehicle speed, a value of an accelerator pedal position sensor (APS), and a value of a brake pedal sensor (BPS). An ideal model for the drive shaft, i.e., a model for calculating an ideal drive shaft speed (model speed) in which vibration is ignored, is designed in order to extract the free vibration component of the drive shaft. The model speed that is the drive shaft speed in which the free vibration component is not included is computed using the designed model. The free vibration component is extracted using a difference between the computed model speed and the drive shaft speed.

At this point, when the model speed is exactly computed as the ideal drive shaft speed in which the vibration component is not included, the exact vibration component is extracted by computing a difference between two values. However, the model speed that is actually computed has an error component when compared with the ideal drive shaft speed in which the vibration component is not included. In order to remove this error, a difference between the model speed and the actual drive shaft speed is obtained. Then an error removal control that uses a high pass filter (HPF) or the like is performed. To that end, the order of an error removal controller, which is suitable for the form (order) of the error component, has to be decided. In the normal case, the order of the error removal controller increases in proportion to the order of the error component. A phase delay occurs more frequently as the order of the error removal controller increases. Because of this, a vibration component different than in the case of actual vibration is extracted. In other words, the lower the order of the error component, the more exact the free vibration component to be extracted can be. Furthermore, in order to reduce the order of the error removal controller, the model speed has to be computed as a value that is as close as possible to the ideal drive shaft speed in which the free vibration component is not included.

The model speed computation unit 120 according to an embodiment of the present disclosure observes a disturbance torque that is applied to a vehicle by applying a disturbance observer when computing the model speed. The model speed computation unit 120 compensates for the disturbance torque in computing the model speed. Accordingly, the model speed computation unit 120 minimizes the order of the error component that is included in the model speed and thus improves the precision of the extraction of the free vibration component.

The free vibration computation unit 130 computes the free vibration component on the basis of deviation between the drive shaft speed and the model speed that is calculated by the model speed computation unit 120. The free vibration computation unit 130 applies the error removal controller, such as the high pass filter, to a value of a difference between the model speed and the drive shaft speed. Thus, the free vibration computation unit 30 calculates the free vibration component. In this case, the free vibration component is a signal from which the forced vibration component is excluded.

The first torque computation unit 140 calculates a free vibration reduction compensation torque for reducing the drive shaft vibration, on the basis of the free vibration component. Specifically, the first torque computation unit 140 computes a reverse-phase signal of the free vibration component extracted by the free vibration computation unit 130. The first torque computation unit 140 calculates the free vibration reduction compensation torque by multiplying the reverse-phase signal of the free vibration component by a reference torque. The reference torque is a preset constant or a fixed ratio of an engine torque or of a total torque applied to a drive system. Alternatively, the reference torque means a value that is obtained by multiplying the engine torque or the total torque applied to the drive system by an amplitude rate in a frequency domain.

The forced vibration compensation torque calculation unit 200 calculates the forced vibration compensation torque for reducing the forced vibration that is to be transferred to the drive shaft of the drive motor 13 due to revolution on the engine 11 or rotation of an engine shaft. The forced vibration compensation torque calculation unit 200 includes the forced vibration extraction unit 210, a reference signal generation unit 220, a filter coefficient decision unit 230, a phase decision unit 240, and a second torque computation unit 250.

The forced vibration extraction unit 210 extracts forced vibration on the basis of the engine shaft speed. The forced vibration extraction unit 210 is realized as a band pass-type digital filter that allows only the forced vibration component occurring during the power stroke in the engine 11 to pass through. In this case, as a cut-off frequency of the digital filter, a desired frequency may be decided in advance for use, and a block frequency thereof that varies with the number of revolutions in the engine 11 may be used. For example, in the four-cylinder, four-stroke internal combustion engine, the power stroke occurs two times with each mechanical revolution, and therefore the power-stroke component in a frequency that is two times the revolution speed of the engine 11 is observed.

Considering this, the cut-off frequency is decided. The decided cut-off frequency is applied in order for the drive shaft speed extraction unit 110 to remove the forced vibration component from an actual drive shaft speed.

The reference signal generation unit 220 generates a reference signal on the basis of a revolution angle (a phase) in the drive motor 13. The revolution angle in the drive motor 13 is measured by a position finder 52. For example, the position finder 52 includes a resolver. For example, the reference signal is a unit sine wave that has a magnitude of 1.

As an example, the reference signal generation unit 220 generates a result (hereinafter referred to as a two-times revolution angle) of multiplying the revolution angle in the drive motor 13 by 2. At this time, in the case of a vehicle that is equipped with a four-cylinder, four-stroke internal combustion engine, the power stroke occurs two times each time the crank shaft rotates one time. Therefore, the revolution angle in the drive motor 13 is multiplied by 2. However, a multiplier varies from one internal combustion engine to another.

The filter coefficient decision unit 230 decides a filter coefficient at which a phase difference between the reference signal generated by the reference signal generation unit 220 and the forced vibration signal extracted by the forced vibration extraction unit 210 is minimized. In this case, the reference signal generated by the reference signal generation unit 220 and the forced vibration signal extracted by the forced vibration extraction unit 210 have the same frequency. First, the filter coefficient decision unit 230 calculates, using an algorithm that is of a recursive least square type, a filter coefficient at which the phase difference between the reference signal generated by the reference signal generation unit 220 and the forced vibration signal extracted by the forced vibration extraction unit 210 is minimized. The filter coefficient decision unit 230 filters the reference signal generated by the reference signal generation unit 220 using the filter coefficient that results from the calculation. In addition, the filter coefficient decision unit 230 calculates the phase difference between the reference signal generated by the reference signal generation unit 220 and the forced vibration signal extracted by the forced vibration extraction unit 210.

A phase decision unit 240 calculates a speed signal by differentiating the revolution angle in the drive motor 13, which is measured by the position finder 52. The phase detection unit 240 detects the phase difference between the reference signal generated by the reference signal generation unit 220 and the forced vibration signal extracted by the forced vibration extraction unit 210. The phase detection unit 240 does so by using the calculated speed signal and the filter coefficient decided by the filter coefficient decision unit 230. In addition, the phase decision unit 240 detects a compensation value for compensating for a phase difference due to a transfer delay from the forced vibration extraction unit 210 to the drive motor 13. The phase decision unit 240 also detects a compensation value for compensating for a phase delay that occurs by the forced vibration extraction unit 210. In this case, the phase delay is a phase delay that occurs by the forced vibration extraction unit 210, i.e., the band pass filter. Specifically, on the basis of the compensation value for compensating for the phase difference due to the transfer delay from the forced vibration extraction unit 210 to the drive motor 13 and on the basis of the compensation value for compensating for the phase delay that occurs by the forced vibration extraction unit 210, the phase decision unit 240 generates a synchronization signal synchronized with the forced vibration signal extracted by the forced vibration extraction unit 210. The phase decision unit 240 generates the synchronization signal that has a phase, which has a value that results from adding compensation values detected by the phase decision unit 240 to a value that results from subtracting the phase difference detected by the phase decision unit 240 from the phase generated by the reference signal generation unit 220. In this case, the phase decision unit 240 may further add the compensation value for compensating for the phase delay that occurs by the forced vibration extraction unit 210.

The second torque computation unit 250 generates a reverse-phase signal using the phase generated by the reference signal generation unit 220, the phase difference between the reference signal and the forced vibration signal, which is detected by the phase decision unit 240, and the compensation values detected by the phase decision unit 240. The second torque computation unit 250 calculates a forced vibration reduction compensation torque by multiplying the generated reverse-phase signal by the reference torque.

A motor controller (MCU) 17 generates an integration torque that results from adding up the free vibration reduction compensation torque and the forced vibration reduction compensation torque. The motor controller 17 calculates an input torque that results from adding a command torque to the integration torque. The input torque is to be applied to the drive motor 13. The command torque is the command torque from a high-level controller (for example, a hybrid controller, not illustrated, or an accelerator pedal, not illustrated). The command torque, for example, is decided on the basis of a position of the accelerator pedal and a speed of the vehicle. In other words, the command torque is a torque of the drive motor 13 that is required according to a driver's operation. In this case, the free vibration compensation torque calculated by the free vibration compensation torque calculation unit 100 is derived on the basis of a signal from which the forced vibration component is removed. Therefore, the free vibration compensation torque does not cause interference with the forced vibration reduction compensation torque.

The control system 1 for reducing drive shaft vibration of an environment-friendly vehicle according to the embodiment of the present disclosure prevents interference that occurs between the free vibration compensation torque for reducing the free vibration and the forced vibration compensation torque for reducing the forced vibration. Thus, the control system 1 prevents a decrease in control performance for compensating for the vibration.

Figure 3:
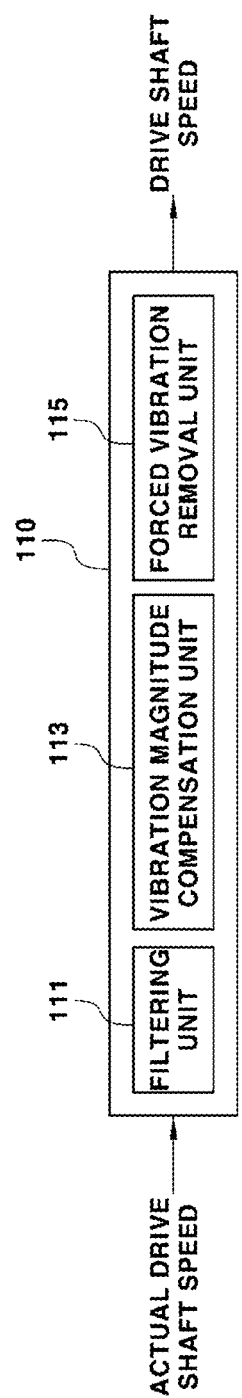
FIG. 3 is a block diagram illustrating a drive shaft speed extraction unit according to an embodiment of the present disclosure.

FIG. 3 is a block diagram illustrating a drive shaft speed extraction unit according to an embodiment of the present disclosure.

With reference to FIGS. 2 and 3, the drive shaft speed extraction unit 110 includes a filtering unit 111, a vibration magnitude compensation unit 113, and a forced vibration removal unit 115.

On the basis of the forced vibration frequency, the filtering unit 111 extracts the forced vibration component from the actual drive shaft speed, which is measured by the drive shaft speed sensor 51. The forced vibration frequency is decided on the basis of the engine shaft speed and is used as the cut-off frequency in the filtering unit 111. The filtering unit 111 is configured by combining a low pass filter and a high pass filter in which the forced vibration frequency is set to be a cut-off frequency. In other words, the filtering unit 111 is a band pass filter for extracting only the forced vibration component. The low pass filter and the high pass filter are designed in such a manner so as not to change a phase of the actual drive shaft speed. For example, the low pass filter and the high pass filter have the same order, which in one example is a second-order filter. When a signal for the actual drive shaft speed passes through the filtering unit 111, only a magnitude (amplitude) of the signal decreases without a phase thereof being changed.

The vibration magnitude compensation unit 113 compensates for a decrease in the magnitude of the signal. In this case, a signal, for which a decrease in magnitude must be compensated for, is a forced vibration component signal, which is a signal that passes through the filtering unit 111.

The forced vibration removal unit 115 removes the forced vibration component signal, the magnitude of which having been compensated for, from the actual drive shaft speed. A value that results from subtracting the forced vibration component signal, the magnitude of which having been compensated for, from the actual drive shaft speed is defined as the drive shaft speed.

The drive shaft speed extraction unit 110 according to the embodiment of the present disclosure calculates the drive shaft speed that results from subtracting the forced vibration component from the actual drive shaft speed. Therefore, the forced vibration component is not taken into consideration in making a calculation of the free vibration reduction torque for compensating for the free vibration. The free vibration reduction torque that results from the calculation thus does not cause interference with the forced vibration reduction torque.

The drive shaft speed extraction unit 110 according to the embodiment of the present disclosure removes the forced vibration component from the actual drive shaft speed. The drive shaft speed extraction unit 110 does so by using the forced vibration frequency that is calculated from the forced vibration signal, which is measured in order to calculate the forced vibration reduction torque.

Figure 4:
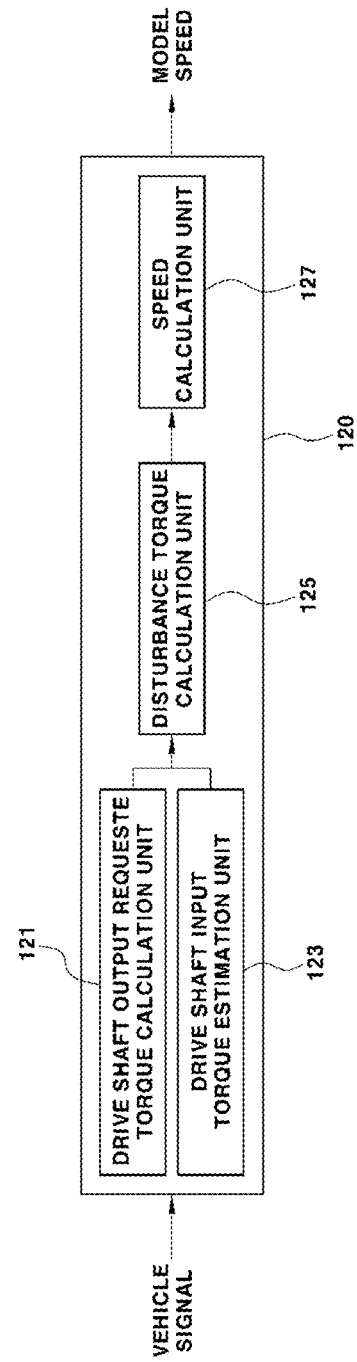
FIG. 4 is a block diagram illustrating a model speed computation unit according to an embodiment of the present disclosure.

FIG. 4 is a block diagram illustrating a model speed computation unit according to an embodiment of the present disclosure;

With reference to FIGS. 2 and 4, the model speed computation unit 120 includes a drive shaft output request torque calculation unit 121, a drive shaft input torque estimation unit 123, a disturbance torque calculation unit 125, and a speed calculation unit 127.

The drive shaft output request torque calculation unit 121 computes a drive shaft output request torque Tnet' on the basis of a torque that is transferred to the drive shaft. The drive shaft output request torque Tnet' is calculated on the basis of torques that are required of the drive motor 13, the engine 11, the starter-generator 15, and a brake system (not illustrated), respectively, and a vehicle load torque Tload. The drive shaft output request torque Tnet' is a value that results from subtracting the vehicle load torque Tload from a torque Tbake that is required of a torque source of the vehicle that causes a torque to act on the drive shaft. The torque source of the vehicle is the drive motor 13, the engine 11, the starter-generator 15, or the brake system. The torque Tbrake that is required of the brake system, like the load torque Tload, is a negative torque. Therefore, the drive shaft output request torque Tnet' is calculated using the following equation.

$$T_{net'} = T_1 + T_2 + T_3 - (T_{brake} + T_{load})$$

At this point, a torque T1 required of the drive motor 13 is a torque command value for the drive motor. Torques T2, T3, and Tbrake that are required of the engine 11, the starter-generator 15, and the brake system, respectively, are all torque values that result from conversion into torques of a shaft of a drive motor MG1.

In this case, the torques T2 and T3 that are required of the engine 11 and the starter-generator 15, respectively, are values that result from converting the respective values of the engine torque command and the starter-generator torque command into the torques of the shaft of the drive motor MG1. The torque Tbrake that is required of the brake system is a value that results from conversion into a brake torque that has to be generated by a brake system of a drive wheel.

The drive shaft input torque estimation unit 123 estimates a drive shaft input torque Tacc' using the measured actual drive shaft speed. When an actual drive shaft input torque Tacc is applied to the drive shaft, the drive shaft is rotated. When a transfer function in the drive shaft is defined as G(s), an actual speed co of the drive shaft and the drive shaft input torque Tacc are expressed as in the following equation.

$$\omega = G(s) \times T_{acc}$$

$$T_{acc} = \omega / G(s)$$

G(s) in the above equation is the transfer function in the actual drive shaft. When a transfer function of an ideal drive shaft model that is modeled on the transfer function, i.e., of a drive shaft model designed to calculate an ideal model speed ω in which vibration is ignored, is defined Gm(s), the drive shaft input torque Tacc' is estimated using Gm(s) instead of G(s) in the above equation.

According to the present disclosure, when it is assumed that the drive shaft is a strong body and when an estimation value of the drive shaft input torque is defined as Tacc', an estimation value of the drive shaft input torque is expressed as in the following equation.

$$T_{acc'} = \frac{\omega}{Gm(s)} = \omega \times Jms$$

In the above equation Jm is an inertial moment of the drive shaft that is a strong body. In a transfer function Gm(s) for computing the drive shaft input torque estimation value Tacc' that is to be applied to the drive shaft, from the actual speed co of the drive shaft, the order of a numerator is higher than the order of a denominator. From a mathematical viewpoint, a system to which the transfer function Gm(s) applies has a structure susceptible to a noise component of the actual drive shaft speed. This is because the computation is performed in which the actual drive shaft speed is differentiated and is multiplied by an inertial moment. Accordingly, by applying a filter Q, it is possible that the denominator and the numerator have the same order. According to an embodiment of the present disclosure, when a first-order low pass filter or LPF is used, the drive shaft input torque Tacc' is estimated using the following equation.

$$T_{acc'} = Q(s) \times \omega / Gm(s)$$

where $Q(s) = 1/(\tau s + 1)$

In the above equation, Q(s) is a transfer function of the low pass filter. A time constant τ of a low pass filter Q is set to be greater than a frequency of a vibration component that is to be attenuated. Thus, a torque that is estimated by the vibration component is excluded. According to the present disclosure, the transfer function Q(s) of the filter is set in such a manner that the order of the numerator of Q(s)/Gm(s) is always equal to or lower than the order of the denominator. By additionally adding such a filter, the order of the numerator of the transfer function Q(s)/Gm(s) for computing the drive shaft input torque estimation value Tacc' from the actual speed co of the drive shaft is set to be always equal to or lower than the order of the denominator. Thus, the robustness against the noise component is ensured.

The disturbance torque calculation unit 125 computes a disturbance torque estimation value d' on the basis of the drive shaft output request torque Tnet' and the drive shaft input torque Tacc'. The disturbance torque estimation value d' is defined as a difference between the drive shaft output request torque Tnet' calculated in the drive shaft output request torque calculation unit 121 and the drive shaft input torque Tacc' calculated in the drive shaft input torque estimation unit 123. The filter Q, which is the same as the filter used in the process of calculating the drive shaft output request torque Tnet', is applied to the process of computing the disturbance torque estimation value d'. Therefore, a phase delay and a magnitude change that occur due to the filter also occur to the drive shaft output request torque. The disturbance torque estimation value d' is computed using the drive shaft output request torque that undergoes the low pass filtering by passing through the filter Q.

According to an embodiment of the present disclosure, when the first-order low pass filter is used, the disturbance torque estimation value d' is estimated using the following equation.

$$d' = Q(s) \times T_{net'} - T_{acc'} = \frac{T_{net'}}{\tau s + 1} - \omega \times \frac{Jms}{\tau s + 1}$$

As described above, when the disturbance torque estimation value d' is estimated, the speed calculation unit 127 computes a drive shaft model input torque Tm for model speed computation using the estimated disturbance torque estimation value d' and the drive shaft output request torque Tnet'. The speed calculation unit 127 computes, using the estimated disturbance torque estimation value d', the drive shaft model input torque Tm that results from adding the disturbance torque estimation value d' to the drive shaft output request torque Tnet'. In this case, an equation for calculating the drive shaft model input torque Tm for the model speed computation is expressed as in the following equation.

$$T_m = T_{Net'} + d'$$

The speed calculation unit 127 computes the model speed ω using a drive shaft model in which the drive shaft model input torque Tm is set to be an input. As described above, when the drive shaft model input torque Tm is calculated, the speed calculation unit 127 computes the model speed ω. In this case, the model speed ω is computed, according to the following equation, from the drive shaft model input torque Tm using the transfer function Gm(s) of the drive shaft model.

$$\omega m = Gm(s) \times Tm = \frac{Tm}{Jms}$$

Figure 5:
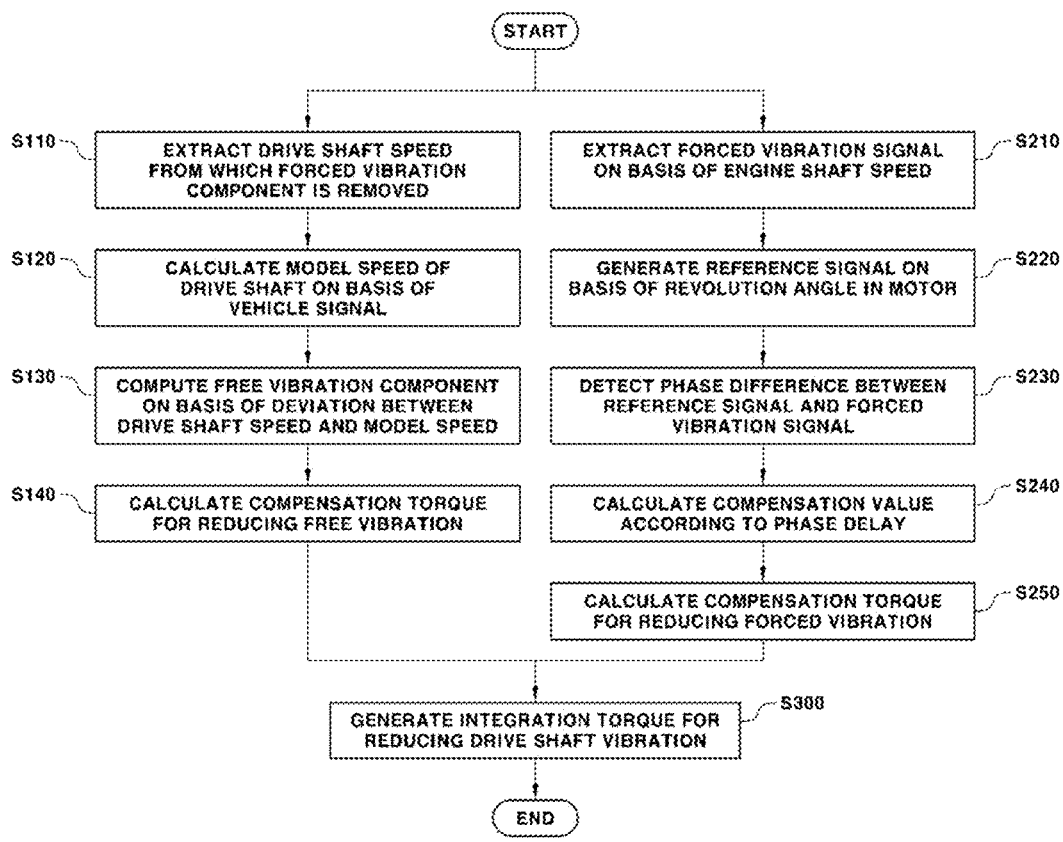
FIG. 5 is a flowchart illustrating a control method of reducing drive shaft vibration of an environment-friendly vehicle according to an embodiment of the present disclosure.

FIG. 5 is a flowchart illustrating a control method of reducing drive shaft vibration of an environment-friendly vehicle according to an embodiment of the present disclosure. For brief description, the same description from above is not repeated below.

With reference to FIG. 5, the drive shaft speed extraction unit extracts the actual drive shaft speed and removes the forced vibration component from the actual drive shaft speed. The actual drive shaft speed from which the forced vibration component is removed is defined as the drive shaft speed. In this case, in order to remove the forced vibration component, a band pass filter is applied to the drive shaft speed extraction unit. The band pass filter is a combination of a low pass filter and a high pass filter or HPF that are designed to have the same order. The band pass filter has the cut-off frequency, and the cut-off frequency is decided by the forced vibration signal that is extracted on the basis of the engine shaft speed. In other words, the cut-off frequency is a frequency of the forced vibration signal (S110).

In order to extract only the free vibration component from a speed signal of the drive shaft, the model speed computation unit computes the model speed that is the virtual drive shaft speed in which the vibration component is not included. The vehicle signals include at least one of a vehicle speed, a value of an accelerator pedal position sensor (APS), and a value of a brake pedal sensor (BPS). An ideal model for the drive shaft, i.e., a model for calculating an ideal drive shaft speed (model speed) in which vibration is ignored is designed in order to extract the free vibration component of the drive shaft. The model speed, which is the drive shaft speed in which the free vibration component is not included, is computed using the designed model (S120).

The free vibration computation unit computes the free vibration component using the difference between the computed model speed and the drive shaft speed. The free vibration computation unit applies the error removal controller, such as the high pass filter, to the value of the difference between the drive shaft speed and the model speed, and thus calculates the free vibration component (S130).

The first torque computation unit computes the reverse-phase signal of the free vibration component. The first torque computation unit also calculates the free vibration reduction compensation torque by multiplying the reverse-phase signal of the free vibration component by the reference torque. The free vibration reduction compensation torque is a value to which the command torque required of a vehicle is not added (S140).

The forced vibration extraction unit extracts the forced vibration signal on the basis of the engine shaft speed (S210).

The reference signal generation unit generates the reference signal on the basis of the revolution angle in the motor (S220).

The phase decision unit synchronizes the reference signal and the forced vibration signal with each other. The phase decision unit detects the phase difference between the reference signal and the forced vibration signal. The phase decision unit also detects the compensation value for compensating for the phase difference due to the transfer delay from the forced vibration extraction unit to the motor and the compensation value for compensating for the phase delay that occurs by the forced vibration extraction unit. The phase decision unit generates, on the basis of the phase difference and the compensation values (S230 and S240), the synchronization signal synchronized with the forced vibration signal extracted by the forced vibration extraction unit.

The second torque computation unit generates the reverse-phase signal using: the phase generated by the reference signal generation unit; the phase difference between the reference signal and the forced vibration signal, which are detected by the phase decision unit; and the compensation values detected by the phase decision unit. The second torque unit calculates the forced vibration reduction compensation torque by multiplying the generated reverse-phase signal by the reference torque (S250).

The motor controller generates the integration torque that is a value that results from adding up the free vibration reduction compensation torque and the forced vibration reduction compensation torque. The motor controller calculates the input torque that results from adding the command torque, which is the torque required by the driving of the vehicle, to the integration torque. The input torque is to be applied to the motor. The command torque is a value that changes in real time on the basis of the position of the accelerator pedal and the speed of the vehicle (S300).

The control method of reducing drive shaft vibration of an environment-friendly vehicle according to the embodiment of the present disclosure performs computation on the basis of the drive shaft speed from which the forced vibration component is removed, in computing the torque for reducing the free vibration. Therefore, the free vibration reduction compensation torque that is finally derived does not cause interference with the forced vibration reduction compensation torque derived through a separate computation process. In conclusion, the control method of reducing drive shaft vibration of an environment-friendly vehicle improves performance of control for reducing the vibration of the motor.

Figure 6:
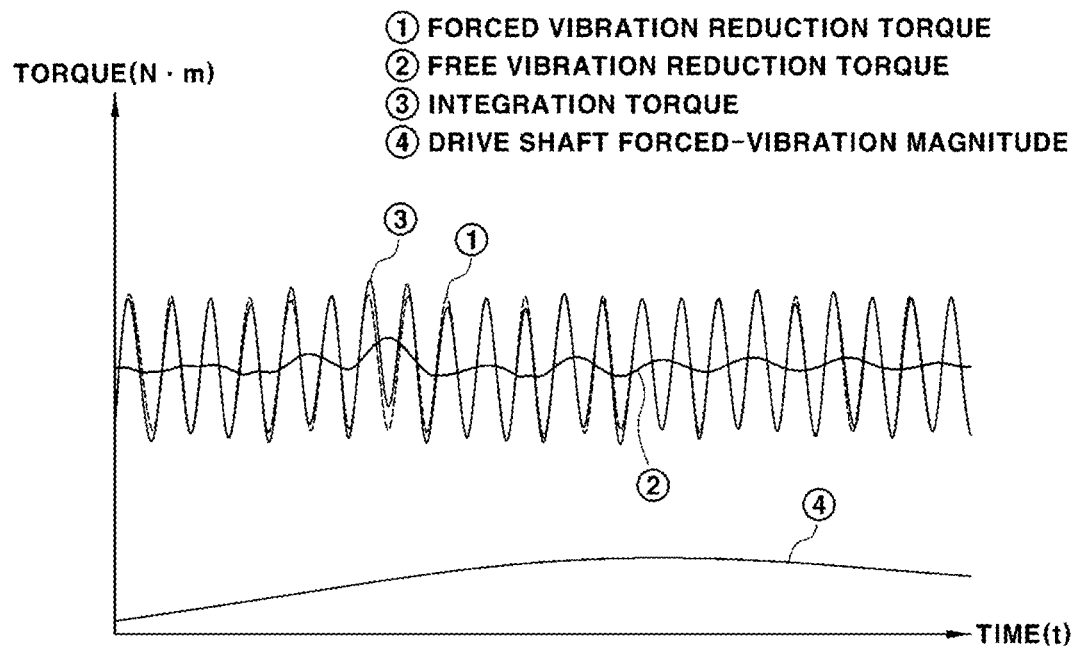
FIG. 6 is a graph illustrating an effect of applying the control system for reducing drive shaft vibration of an environment-friendly vehicle according to the embodiment of the present disclosure.

FIG. 6 is a graph illustrating an effect of application of the control system for reducing drive shaft vibration of an environment-friendly vehicle according to the embodiment of the present disclosure.

With reference to FIGS. 2 and 6, the free vibration reduction torque calculated by the free vibration compensation torque calculation unit 100 and the forced vibration reduction torque calculated by the forced vibration compensation torque calculation unit 200 have different frequencies and magnitudes. However, from a phase of the free vibration reduction torque and a phase of the forced vibration reduction torque, it is known that a time when a peak of the free vibration reduction torque appears and a time when a peak of the forced vibration reduction torque appears are close to each other. In other words, the free vibration reduction torque and the forced vibration reduction torque do not cause interference with each other. Therefore, an amplitude of the integration torque that is a value, which results from adding up the free vibration reduction torque and the forced vibration reduction torque, is higher than an amplitude of the forced vibration reduction torque. In a case where the free vibration reduction torque and the forced vibration reduction torque cause interference with each other, the amplitude of the integration torque is lower than the amplitude of the forced vibration reduction torque.

According to an embodiment of the present disclosure, the free vibration reduction torque and the forced vibration reduction torque are prevented from causing interference with each other. Thus, a magnitude of the forced vibration of the drive shaft can be decreased by 20%.

The embodiments of the present disclosure are described above with reference to the accompanying drawings. It should be apparent to a person of ordinary skill in the art to which the present disclosure pertains that the present disclosure can be implemented into other embodiments without modification to the technical idea and essential features thereof. Therefore, it should be understood that, in every aspect, the embodiments described above are examples and are not restrictive.

What is claimed is:

1. A control system for reducing drive shaft vibration of an environment-friendly vehicle, the control system comprising:
    a drive shaft speed extraction unit that extracts an actual drive shaft speed of a motor and extracts a drive shaft speed from which a forced vibration component that is to be transferred by an engine to the drive shaft is removed;
    a model speed computation unit that calculates a model speed of the drive shaft;
    a free vibration computation unit that computes a free vibration component on the basis of deviation between the drive shaft speed and the calculated model speed; and
    a first torque computation unit that calculates, from the free vibration component, a free vibration reduction compensation torque for reducing the drive shaft vibration,
    wherein the drive shaft speed extraction unit extracts the drive shaft speed from which the forced vibration component is removed, on the basis of a forced vibration frequency that is derived on the basis of an engine shaft speed.

2. The control system according to claim 1, wherein the forced vibration frequency is a vibration frequency of the engine, which is calculated on the basis of a number of cylinders in the engine and a number of revolutions in the engine.

3. The control system according to claim 1, wherein the drive shaft speed extraction unit comprises:
    a filtering unit that extracts the forced vibration component from the actual drive shaft speed on the basis of the forced vibration frequency;
    a vibration magnitude compensation unit that compensates for a vibration magnitude of the forced vibration component; and
    an enforced vibration removal unit that makes a calculation of the drive shaft speed that is a value, which results from subtracting the forced vibration component, of which the vibration magnitude is compensated for, from the actual drive shaft speed.

4. The control system according to claim 3, wherein the filtering unit is configured with a combination of a low pass filter and a high pass filter in which the forced vibration frequency is set to be a cut-off frequency.

5. The control system according to claim 4, wherein the low pass filter and the high pass filter are designed to not change a phase of the actual drive shaft speed.

6. The control system according to claim 1, wherein the model speed computation unit comprises:
    a drive shaft output request torque calculation unit that computes a drive shaft output request torque on the basis of a torque that is transferred to the drive shaft;
    a drive shaft input torque estimation unit that estimates a drive shaft input torque that is to be input to the drive shaft, using the actual drive shaft speed;
    a disturbance torque calculation unit that estimates a disturbance torque using the drive shaft output request torque and the drive shaft input torque; and
    a speed calculation unit that computes, using the estimated disturbance torque, a drive shaft model input torque, which results from adding the disturbance torque to the drive shaft output request torque, and that computes a model speed using a drive shaft model in which the drive shaft model input torque is set to be an input.

7. The control system according to claim 1, wherein the model speed is an ideal drive shaft speed in which the free vibration component is not included, and
    wherein a value that results from subtracting the model speed from the drive shaft speed is the free vibration component from which the forced vibration component is removed.

8. A control method of reducing drive shaft vibration of an environment-friendly vehicle, the control method comprising:
    extracting an actual drive shaft speed of a motor;
    removing, from the actual drive shaft speed, a forced vibration component that is to be transferred by an engine to the drive shaft;
    calculating a model speed of the drive shaft;
    computing a free vibration component on the basis of deviation between a drive shaft speed from which the forced vibration component is removed and the calculated model speed; and
    calculating, from the free vibration component, a free vibration reduction compensation torque for reducing vibration of the drive shaft,
    wherein in the removing of the forced vibration component from the actual drive shaft speed, the actual drive shaft speed is filtered on the basis of a forced vibration frequency that is derived on the basis of an engine shaft speed, and thus the drive shaft speed from which the forced vibration component is removed is extracted.

9. The control method according to claim 8, wherein the removing of the forced vibration component from the actual drive shaft speed comprises:
    setting the forced vibration frequency to be a cut-off frequency and extracting the forced vibration component from the actual drive shaft speed;
    compensating for a vibration magnitude of the forced vibration component; and
    calculating, from the actual drive shaft speed, the drive shaft speed that is a value, which results from subtracting the forced vibration component of which the vibration magnitude is compensated for.

10. The control method according to claim 8, wherein the model speed is an ideal drive shaft speed in which the free vibration component is not included, and
    wherein a value that results from subtracting the model speed from the drive shaft speed is the free vibration component from which the forced vibration component is removed.

* * * * *